(No Model.) 3 Sheets—Sheet 1.
W. W. BURSON.
CORN HARVESTER.
No. 436,823. Patented Sept. 23, 1890.
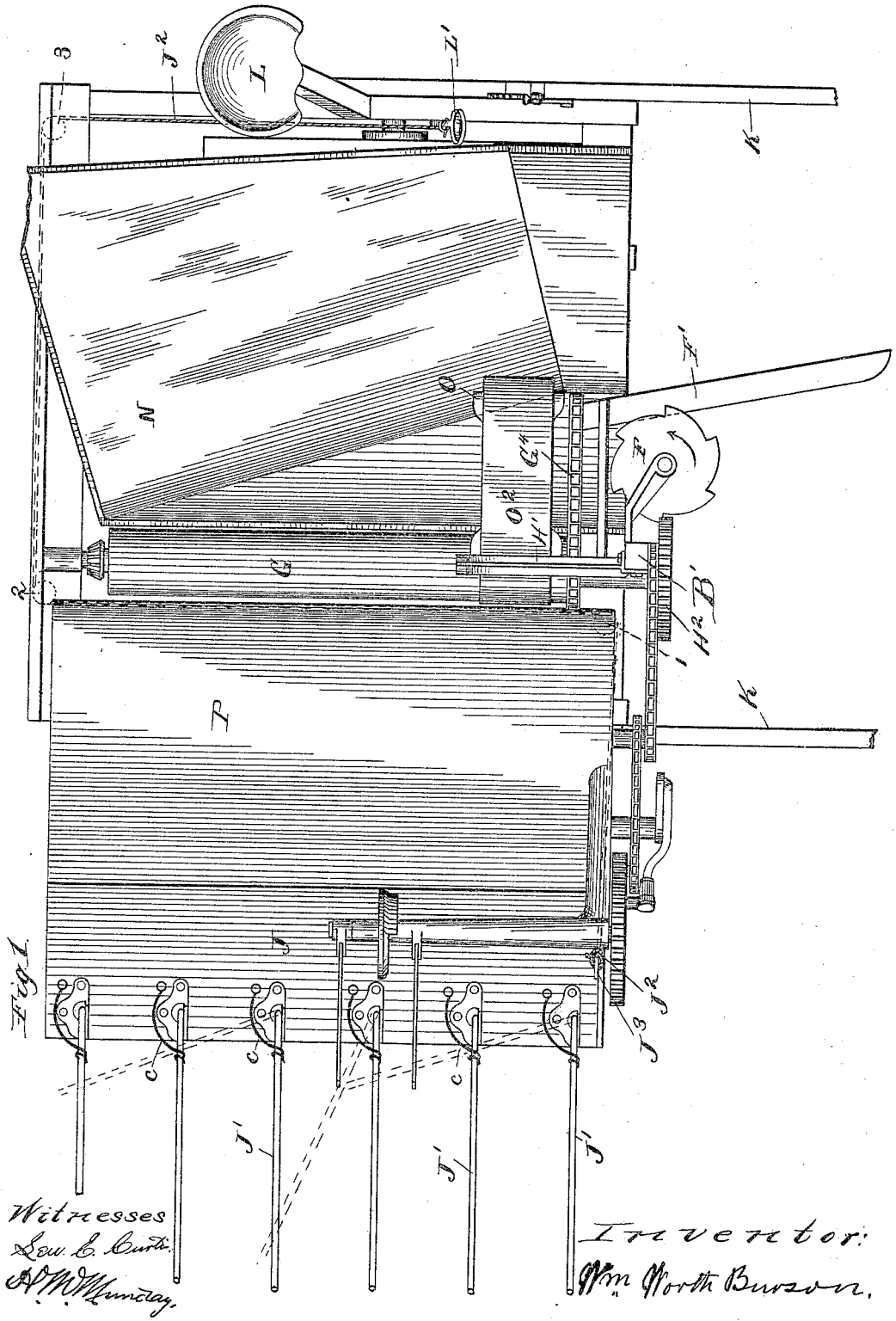

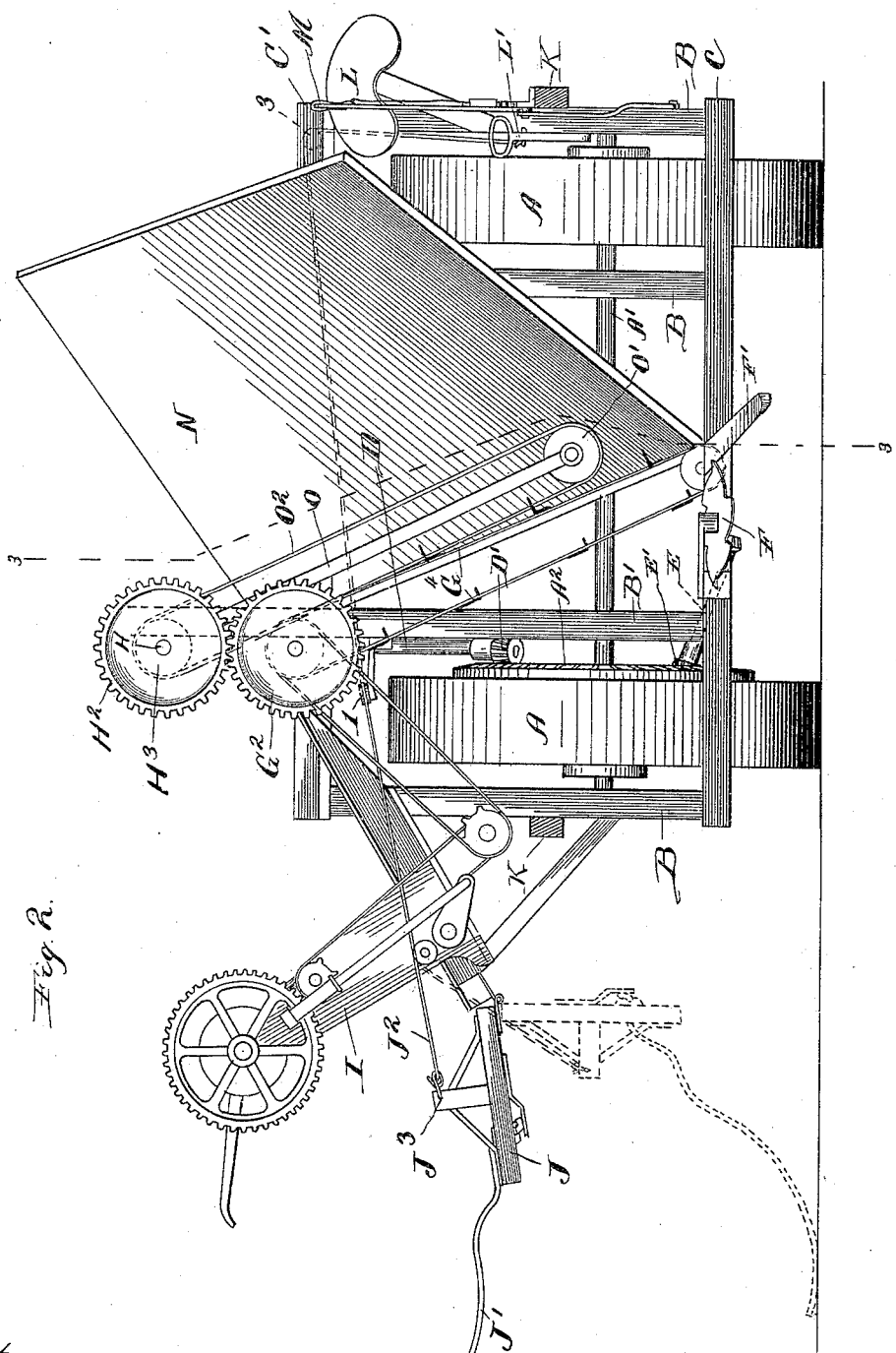

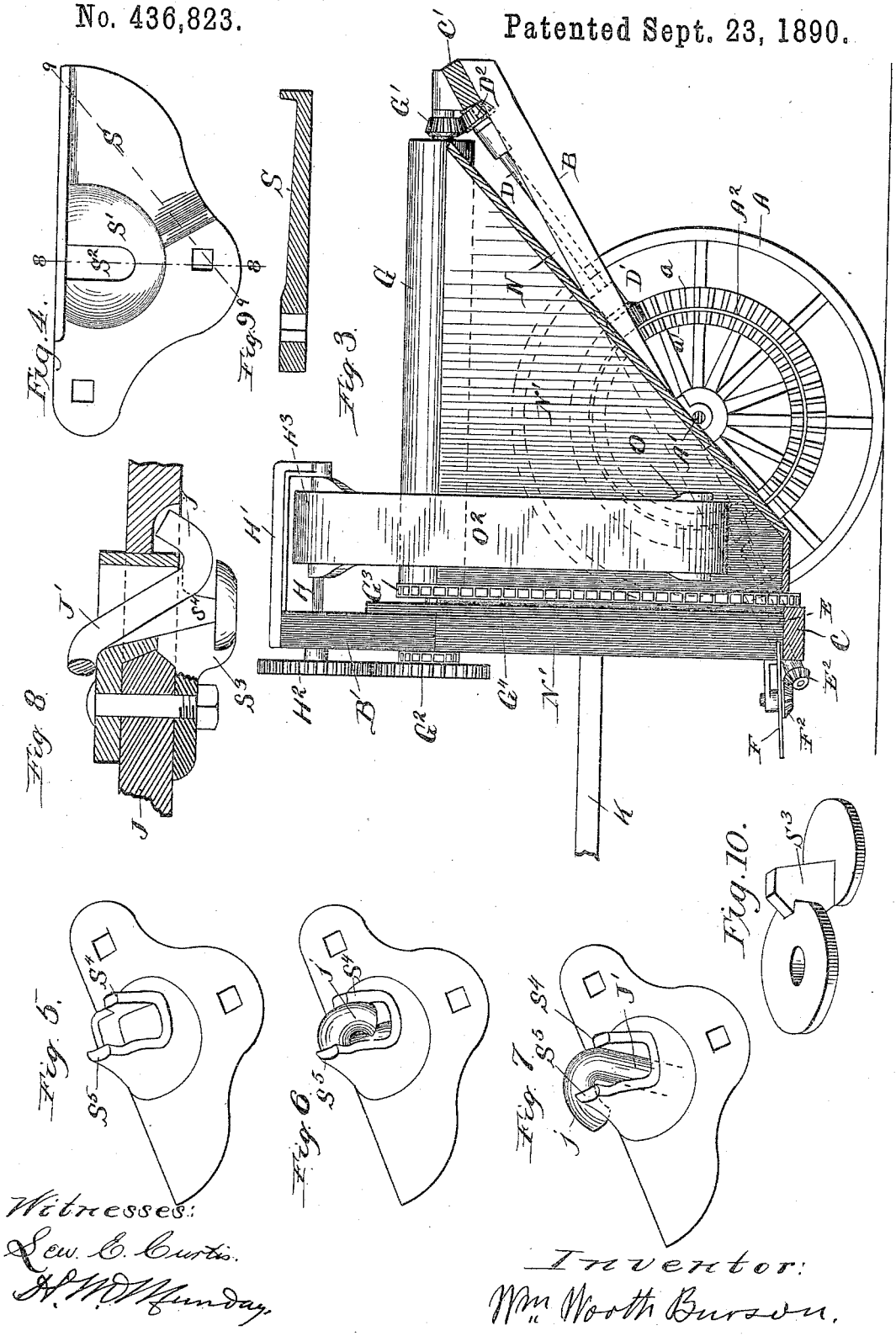

UNITED STATES PATENT OFFICE.

WILLIAM WORTH BURSON, OF CHICAGO, ILLINOIS.

CORN-HARVESTER.

SPECIFICATION forming part of Letters Patent No. 436,823, dated September 23, 1890.

Application filed August 23, 1889. Serial No. 321,700. (No model.)

*To all whom it may concern:*

Be it known that I, WILLIAM WORTH BURSON, a citizen of the United States, residing at Chicago, in the county of Cook and State of Illinois, have invented a new and useful Improvement in Corn-Harvesters, of which the following is a specification.

My invention relates to an improvement in corn-harvesters, in which the corn is cut, elevated to a binder, bound into bundles, and the bundles carried and dropped upon the ground in bunches convenient for shocking; and the objects of my invention are, first, to provide an improved receiving-platform for the severed stalks; second, to provide an improved elevating mechanism to raise the stalks to the binder; third, to provide an improved carrying and dumping mechanism for depositing the bound bundles in bunches upon the ground convenient for shocking, and in general to improve and simplify corn-harvesters. I attain these objects by the mechanism illustrated in the accompanying drawings, in which—

Figure 1 is a plan view. Fig. 2 is a front elevation. Fig. 3 is a section of Fig. 2 on line 3 3. Fig. 4 is a top view of plate S. Fig. 5 is an inverted view of the same. Figs. 6 and 7 show the manner of inserting rod J through the plate. Fig. 8 is a section on line 8 8, Fig. 4, showing other parts attached. Fig. 9 is a section on line 9 9, Fig. 4. Fig. 10 shows foot-piece $S^3$.

Similar letters of reference denote the same parts throughout the several views.

In the organization of corn-harvester here shown the mechanism is supported upon the two driving-wheels A A, ratcheted upon shaft A' in any convenient manner. The frame-pieces B B rest upon shaft A' in suitable bearings—one on each side of the driving-wheels—their forward ends being fastened rigidly to the front bar C and the rear ends to the bar C', Fig. 2. An upright piece B', fastened at its lower end to the front part of the frame and properly braced, supports the elevating mechanism. The inclined board N' rests upon beam C, and its upper end is supported by post B', parallel to chain $G^4$. The frame here described is very simple in construction and may be varied to suit the wishes of the builder. The beveled gear $A^2$ is fastened rigidly to shaft A'. It is preferably made with an outer circle of teeth $a$, adapted to mesh into pinion D' on shaft D, held in suitable bearings on the rear of the main frame. The inner circle of teeth $a'$ mesh in pinion E' on shaft E, held in suitable bearings and extending forward to give movement to the cutting-disk F by means of pinion $E^2$ on shaft E, meshing in gear $F^2$ on the cutting-disk shaft. On the rear end of shaft D is the pinion $D^2$, which meshes in the teeth of gear G' on the rear end of the shaft of roller G. Roller G extends longitudinally in a horizontal position, forming the upper end of the elevator. The rear end of roller G is supported in a bearing fastened to frame-piece C' and the front end in a bearing supported on B'. On the front end of roller G is the spur-gear $G^2$, sprocket $G^3$, and chain $G^4$. The front end of shaft H is supported in bearings secured to the upright piece B' and the rear end of said shaft is supported in bracket H', fastened to the upright piece B'.

The binder I is placed in convenient position to receive the stalks from the elevator, and may be of any approved form, and is shown here only to illustrate its position in the harvesting mechanism, and no detailed description of it is considered necessary. The bundle-receiving table J, which is provided with the pivoted extension-rods J', is preferably hinged to the binder-decks P, and will be hereinafter described.

I make two tongues K, and prefer to hinge one part on each outer side of the frame. (Shown in Figs. 1 and 2.) As this plan is not novel, it requires no detailed description. The seat L is conveniently placed on the frame-piece B opposite the binder, so as to equalize the weight upon the driving-wheels. The tilting-lever M, located in easy reach of the driver, connects the tongue with frame-piece B and enables the driver to raise and lower the front part of the machine by tilting on the shaft A', as is well understood in this class of machinery, and need not be further described.

The receiving table or platform N, Figs. 1 and 2, is placed so as to receive the cut stalks, and the inner edge next to the elevator is inclined upward from the front cross-beam C to the beam C', and the outer edge is raised so that the tops of the stalks shall slide downward toward the binder-table as the butts are being carried up, as will be hereinafter more fully explained. This inclined position of the receiving-platform arrests the stalks from falling to a horizontal position, thereby saving the labor of raising them again in elevating them, and also prevents their being thrown backward over the platform by the reeling device. (Not here shown.) The upper-elevator belt $O^2$ receives its movement from the driving-roller $H^3$ on shaft H, the lower end passing about the roller O', held on arm O, the upper end of which is held in bracket H'. The lower-elevator chain $G^3$ is provided with teeth to engage with and carry the butts of the severed stalks over roller G, thereby delivering them to the binder, the inclined surface of the receiving-platform N causing the tops of the stalks to readily pass to the binder without other mechanism than such incline.

Having thus described my invention in a general way, I wish to point out more fully some of its details.

I have omitted showing the details of hitching to the harvester and guiding it, as that feature is well understood and may be varied to suit the wishes of the builder. Certain other parts have been omitted from the case—as, for instance, the guide-rods to bring the leaning or broken stalks to the cutters, also reels or gathering-chains to bring the stalks to the cutters—as these parts are well understood, and their illustration here would only tend to confuse the case.

In operation the team is hitched to the harvester in such manner and drawn forward so that the stationary knife F' and revolving knife F shall come in contact with the stalk-row and sever the stalks by the action of the cutting mechanism. The stationary knife F' is fastened to the cross-bar C or other convenient support, and has a cutting-edge on its inner upper edge, which is set at such an angle as to engage the stalk and cut it with a sliding upward stroke until it comes in contact with the revolving cutting-disk F, which has a shear-cut movement with the stationary knife. The revolving cutting-disk F, Fig. 1, has a series of blades, each having a radial front edge sufficient to engage a stalk, the back edge retreating to the next blade. This form of cutting-disk is adapted to engage the stalks with a gathering movement and force them against the stationary knife, whereby they are cut as the machine advances. The speed of the revolving cutting-disk is preferably about that of the forward advance of the machine, so that when it engages a stalk it will force it upon the stationary knife, and by the combined action of both be easily cut, when it will fall upon the inclined table N, and the butts, being engaged by the toothed chain $G^4$ and the revolving belt or canvas $O^2$, are readily passed over the roller G, the tops keeping equal pace, at least, on account of the inclined surface of table N. On this system of cutting corn and other crops it will be seen that the tops do not require elevating at all, not being permitted to fall below the level of the top of the elevator, and the inclined surface of the receiving-platform dispenses with any carrying mechanism to pass the tops of the stalks over the elevator-roller G.

Having explained the delivery of the cut corn upon the binder-deck P, I pass over the description of the action of the binder in tying the bundles of uniform size, as this part is well understood, and no novelty is here attempted to be shown, and assume that the bundles are bound and delivered upon the bundle-carrier by the action of the binder, and that when a sufficient number have accumulated the driver releases the foot-lever L' and the bundles are delivered on the ground. This bundle-carrying mechanism is designed as an improvement on one for which I applied for Letters Patent, filed May 10, 1889, Serial No. 310,265, and while it is adapted for use upon any harvesting-machine it has a special adaptation to the corn-harvester.

The main difference between the present carrier and my former one, just referred to, is that in the former the pivots or rods J' were shown perpendicular to the surface of the receiving-table, and of course were substantially rigid, except the radial sweep on said pivot, while in this the pivotal connection is such that the outer end of the rod has a vertical movement of nearly a right angle to the surface of the receiving-table, and when dropped to discharge its load the receiving-table assumes a vertical position, or nearly so, and the rods a position nearly horizontal and are drawn endwise the width of the table from under the outer bundles.

The manner of discharging the bundles differs in this carrier from all others, so far as I know, since they may be dropped directly upon the ground as the receiving-table may assume a vertical position and the receiving-rods rest nearly their entire length upon the ground, and are drawn from under the bundles as the harvester moves forward. The manner of discharging the bundles just described is correct when the receiving-table is of such width and hinged in such relation to the elevation from the ground that the outer edge of the table in discharging shall be near the ground. In some plans of constructing the harvester it may be hinged high enough that the table and extension-rods shall, in discharging, assume a nearly vertical position, and in general the bundles on the outer ends of the rods are dropped directly to the ground, and, as above described, under certain forms of construction all the bundles would be so deposited without rolling or sliding off the carrier, as is the manner of discharge with others.

It should be observed that the receiving-table can be raised into operating position while the extension-rods are folded to its edge—a very desirable feature for working in the stiff stubble of corn—and that the rods are moved into receiving position by the action of the bundle upon them when discharged by the binder.

The bundle-receiving table J is preferably hinged to the binder-deck, and is supported in receiving position by the chain or cord $J^2$, which is attached to the arm $J^3$, secured to the table, and passing about the sheaves 1, 2, and 3, Fig. 1, is attached to the foot-lever L'. Since the stubs or stubble of the cut stalks are stiff and unyielding, it is desirable that the receiving-table should not be wide enough to come in contact with them, as they would interfere with its free action. To increase the carrying capacity of the mechanism, the extension-rods J' are pivoted near the outer edge of the receiving-table. The first consideration in pivoting these extension-rods is that the pivot be perpendicular to the table, giving the rods a sweep parallel to the table. For use in corn-stubble and some other situations it is desirable that the outer ends of the rods each have an independent vertical movement in its connection with the receiving-table, amounting to something less than ninety degrees; but the radial and vertical movements do not entirely meet the requirements of the work to be performed, as the rod when in discharging position needs a limited axial movement, such as is obtained by a loose pivot. These conditions are all met by the pivoted mechanism here shown as connecting the rods with the table. It is seen that each rod in all its movements is entirely independent of the others, which is very desirable for use in corn-fields, where one rod may be arrested in its movement without affecting the movement of the other rods or the receiving-table. The pivoted end of rod J' is bent downward, preferably less than a right angle, and at the end is an outward bend $j$, Fig. 8. Plate S has a cup-shaped depression S', perpendicular on one side, terminating in a slotted opening $S^2$. This opening permits the bent end of rod J' being inserted, as shown in Figs. 6, 7, and 8.

It is desirable to limit the radial movement of the rod J' to substantially a right angle with the path of the harvester, and that the rearward movement be limited to substantially a line parallel with said path. The bent end $j$ is employed to hold the rod in its pivotal position, as also to limit the radial movement of the rod. When the end $j$ comes in contact with stud $S^4$ on the under side of plate S, it arrests the forward movement of rod J', and when it comes in contact with stud $S^5$ its rearward movement is stopped. The foot-piece $S^3$, fastened on the under side of table J, closes a part of the slotted opening $S^2$ and covers the bent end $j$, so that it cannot slip through the opening. It will thus be seen that the plate S and foot-piece $S^3$, when constructed as described, make a hinged or pivoted connection for rod J' with table J, which permits a limited radial perpendicular and axial movement of rod J', all of which movements are desirable to have in this mechanism. It will be observed that the operating cord or chain $J^2$ passes under the table N to reach the foot-lever L', thereby being protected from the falling stalks.

A spring $c$, Fig. 2, is applied to each rod J' to aid in bringing it into receiving position when so desired. The form of this spring and manner of its application can be varied to suit the wishes of the maker. One form of construction is to have the end of the spring which is in contact with the rod encircle the same, the spring being made either of narrow flat steel or round steel. The upper surface of plate S may be a true plane, or it may be an incline, as shown in Fig. 9, or cam-shaped, and the movement of the rods will be varied thereby, as is easily understood.

I do not wish to confine myself to the construction and arrangement of the mechanism as here shown, as various modifications can be made. Instead of the cutting device here shown, the well-known sickle and slot-guard could be used. Instead of a "square-draft" machine, as here shown, driving astride of the row being harvested, a "side-draft" machine could be made, using substantially all the novelties here shown. Instead of the single-toothed chain used in elevating, a canvas or series of chains could be used. Other modifications would readily suggest themselves to the skilled harvester-man.

What I claim as my invention, and desire to secure by Letters Patent, is—

1. In a corn-harvester, the combination of a cutting mechanism, a receiving-platform inclined upward from the front toward the rear to about the height of the elevator, the outer rear part being the highest, said platform adapted to arrest the tops of the stalks from falling below the level of the elevator and to incline them toward the binding-table, and an elevator adapted to deliver the butts of the stalks to the binder-table, substantially as set forth.

2. In a corn-harvester, the combination of a cutting mechanism, a receiving-platform inclined upward from the front, the rear edge inclined toward the binder-table, whereby the tops of the cut stalks are arrested from falling below the level of the elevator position when cut and slide upon said inclined surface toward the binder-table, an elevator to deliver the butts of the stalks to the binder-table, and a binder to tie the bundle, the whole operating substantially as specified.

3. In a corn-harvester supported upon two wheels adapted to be drawn directly behind the team, the combination of a cutting mechanism adapted to cut the stalk-row, an elevating mechanism adapted to deliver the cut stalks to the binder, a binder to tie the bundles, located on one side of the cutting mechanism, and the driver's seat located on the other side of said cutting mechanism, whereby the driver's weight shall counterpoise the binder, substantially as set forth.

4. In a corn-harvester supported upon two carrying-wheels adapted to be drawn directly behind the team, the combination of a cutting mechanism adapted to cut the stalks, an elevating mechanism adapted to deliver the butts of the cut stalks to a binder, and a bundle-carrying mechanism adapted to carry the bound bundles, provided with a controlling cord or other means connecting the said carrier with a lever operated by the driver located on the side of the cutting mechanism opposite the binder, the whole operating substantially as and for the purpose set forth.

5. In a harvesting-machine, the combination of a cutting mechanism, an elevating mechanism adapted to engage the butts of the cut stalks underneath and another to engage the butts on the upper side, whereby the butts are raised and the stalks delivered to the binder, a binder and a receiving-platform inclined upward from the front toward the rear, the outer part being the highest, whereby the tops of the stalks shall slide toward the binder-table, the whole adapted to operate substantially as and for the purpose set forth.

6. In a harvesting-machine, the combination of a cutting device, an elevating device adapted to engage the butts of the cut stalks underneath, an upper elevator having a revolving carrier or belt, an upper roller, and a lower roller, the lower roller supported by an arm hinged at the upper end of the carrier, with means for operating the same, and a receiving-platform inclined upward from the front toward the rear, the outer part being the highest, whereby the tops of the stalks shall slide toward the binder-table, the whole adapted to operate substantially as and for the purpose set forth.

7. In a harvesting-machine, the combination of a cutting and a binding mechanism and a bundle-carrier, with means for operating the same, said bundle-carrier consisting, essentially, of a hinged receiving-table provided with extension-rods pivoted near its outer edge, said rods given a limited horizontal and vertical and axial movement, substantially as specified.

8. In a harvesting-machine, the combination of a receiving-table J, hinged at substantially right angles to the front sill, the plates S, provided with a nearly-vertical tube-shaped opening fastened on the upper side of said table near its outer edge, and the extension-rods J', provided with bent ends adapted to pass through said openings and to be held loosely in the same by the foot-piece $S^3$, fastened on the under side of said table, whereby the rods are given a pivoted connection with said table, substantially as specified.

9. In a harvesting-machine, the combination of a hinged receiving-table J, with means for operating the same, said table provided with the extension-rods J', provided with the bent end $j$, the plates S, provided with the dependent studs $S^4$ and $S^5$, the whole adapted to operate substantially as and for the purpose specified.

10. In a harvesting-machine, the combination of a hinged receiving-table J, pivoted thereto, the extension-rods J', provided with the bent end $j$, and plates S, provided with the dependent studs $S^4$ and $S^5$, and the foot-pieces $S^3$, with means for operating the same, the whole adapted to operate substantially as and for the purpose set forth.

11. In a harvesting-machine, the combination of a hinged receiving-table J, the extension-rods J', pivoted thereto, and the springs $c$, applied to said rods, with means for operating the same, the whole adapted to operate substantially as and for the purpose set forth.

WILLIAM WORTH BURSON.

Witnesses:
H. M. MUNDAY,
LEW. E. CURTIS.